United States Patent
Rydbeck

(10) Patent No.: US 6,233,467 B1
(45) Date of Patent: May 15, 2001

(54) MOBILE PHONE DISPLAY

(75) Inventor: Nils Rydbeck, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/040,822

(22) Filed: Mar. 18, 1998

(51) Int. Cl.⁷ ................................................ H04M 1/00
(52) U.S. Cl. ........................ 455/566; 455/90; 455/550; 455/569; 455/572; 455/575
(58) Field of Search .......................... 455/566, 90, 550, 455/569, 573; 345/141, 147, 177, 467–472; 348/62–63; 358/366; D14/137, 138

(56) References Cited

U.S. PATENT DOCUMENTS

| 5,386,218 | | 1/1995 | Yano et al. ........................... 345/129 |
| 5,406,305 | * | 4/1995 | Shimomura et al. ................. 345/102 |
| 6,049,722 | * | 4/2000 | Umemoto et al. ................... 455/553 |
| 6,052,603 | * | 4/2000 | Kinzalow et al. ................... 455/557 |
| 6,058,319 | * | 5/2000 | Sadler ................................. 455/569 |

FOREIGN PATENT DOCUMENTS

| 0 590 493 A1 | 4/1994 | (EP) . |
| 2 312 132 | 10/1997 | (GB) . |
| WO 90/16052 | 12/1990 | (WO) . |
| PCT/US99/ 05843 | 7/1999 | (WO) . |

OTHER PUBLICATIONS

Patent Abstracts of Japan, JP 09 252342 A (Mitsubishi Electric Corp.); Sep. 22, 1997, abstract.

\* cited by examiner

*Primary Examiner*—Nay Maung
*Assistant Examiner*—Temica M. Davis
(74) *Attorney, Agent, or Firm*—Jenkens & Gilchrist, P.C.

(57) ABSTRACT

A mobile phone with a display is disclosed, which automatically compensates for situations in which poor lighting conditions are likely, by producing a much larger, bolder font than normal. For example, the larger, bolder font is displayed when external power is applied to the mobile phone, or when the mobile phone is being operated in the hands-free mode.

3 Claims, 2 Drawing Sheets

MOBILE PHONE DISPLAY

BACKGROUND OF THE INVENTION

1. Technical Field of the Invention

The present invention relates in general to the mobile communications field and, in particular, to an improved display for a mobile phone.

2. Description of Related Art

When conventional mobile phones are used in dimly-lit environments (e.g., inside motor vehicles, etc.), poor lighting, glare and reflections typically make the phones' displays difficult to read. This readability problem is exacerbated if the phone is being operated in a hands-free mode. For example, in an automobile, a mobile phone's display is more difficult for a driver to read due to the relatively long distance between the vehicle-mounted hands-free adaptor and the driver's eyes.

A conventional solution to this readability problem for mobile phone displays is to activate backlighting to illuminate the display when the phone is externally powered. As such, the backlit illumination highlights the displayed text and serves to make it more readable. However, a problem that still occurs with conventional mobile phone displays (even with backlit illumination) is that the text used on the conventional displays is too small to be clearly discernible unless the display is very close to the user. Nevertheless, as described below, the present invention successfully resolves this readability problem.

SUMMARY OF THE INVENTION

It is, therefore, an object of the present invention to provide a mobile phone display that is clearly readable in a poorly-lit environment.

It is another object of the present invention to provide a mobile phone display that a driver of a motor vehicle can easily see when the phone is being operated in a hands-free mode.

It is yet another object of the present invention to provide a mobile phone display that automatically adjusts to compensate for a poorly-lit or hands-free environment.

The foregoing and other objects are achieved by a mobile phone with a display that automatically uses a much larger, bolder font than normal, whenever, for example, external power is applied or the mobile phone is operated in a hands-free mode.

An important technical advantage of the present invention is that the mobile phone display with larger, bolder font is clearly discernible in poorly-lit environments.

Another important technical advantage of the present invention is that the mobile phone display is easy to see and read when the phone is operated in a hands-free mode.

Still another important technical advantage of the present invention is that the mobile phone display is readable in those situations where poor lighting, glare or reflections exist.

Yet another important technical advantage of the present invention is that the readability of the mobile phone display is automatically adjusted to compensate for situations in which poor lighting conditions are likely to exist.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
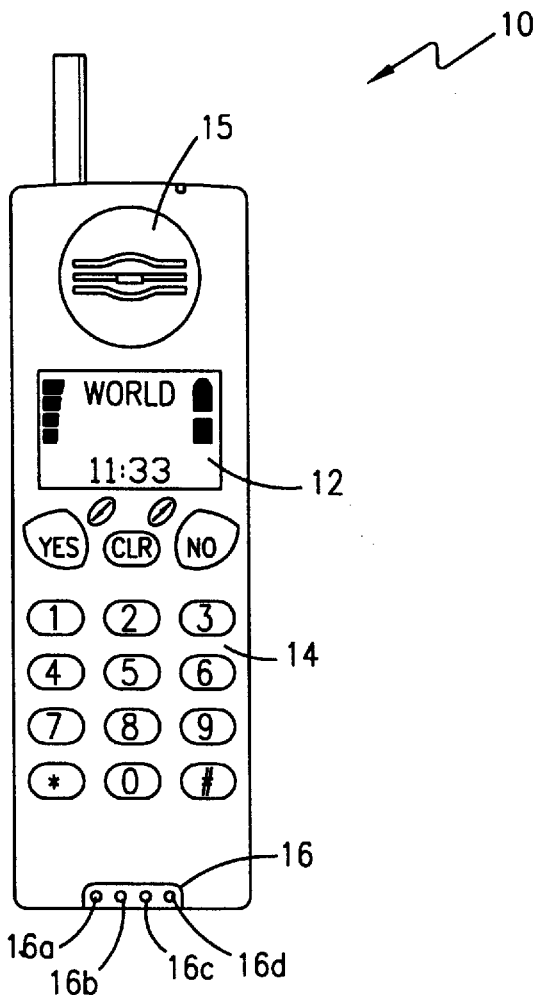
FIG. 1 is a diagram of a mobile phone with a display that automatically adjusts to compensate for situations in which poor lighting conditions may exist, in accordance with a preferred embodiment of the present invention.
Figure 3A:
FIG. 3A is an example of a conventional, normal font mobile phone display.
Figure 3B:
FIG. 3B is an example of the larger, bolder font that can be displayed by a mobile phone, in accordance with the preferred embodiment of the present invention.
Figure 2:
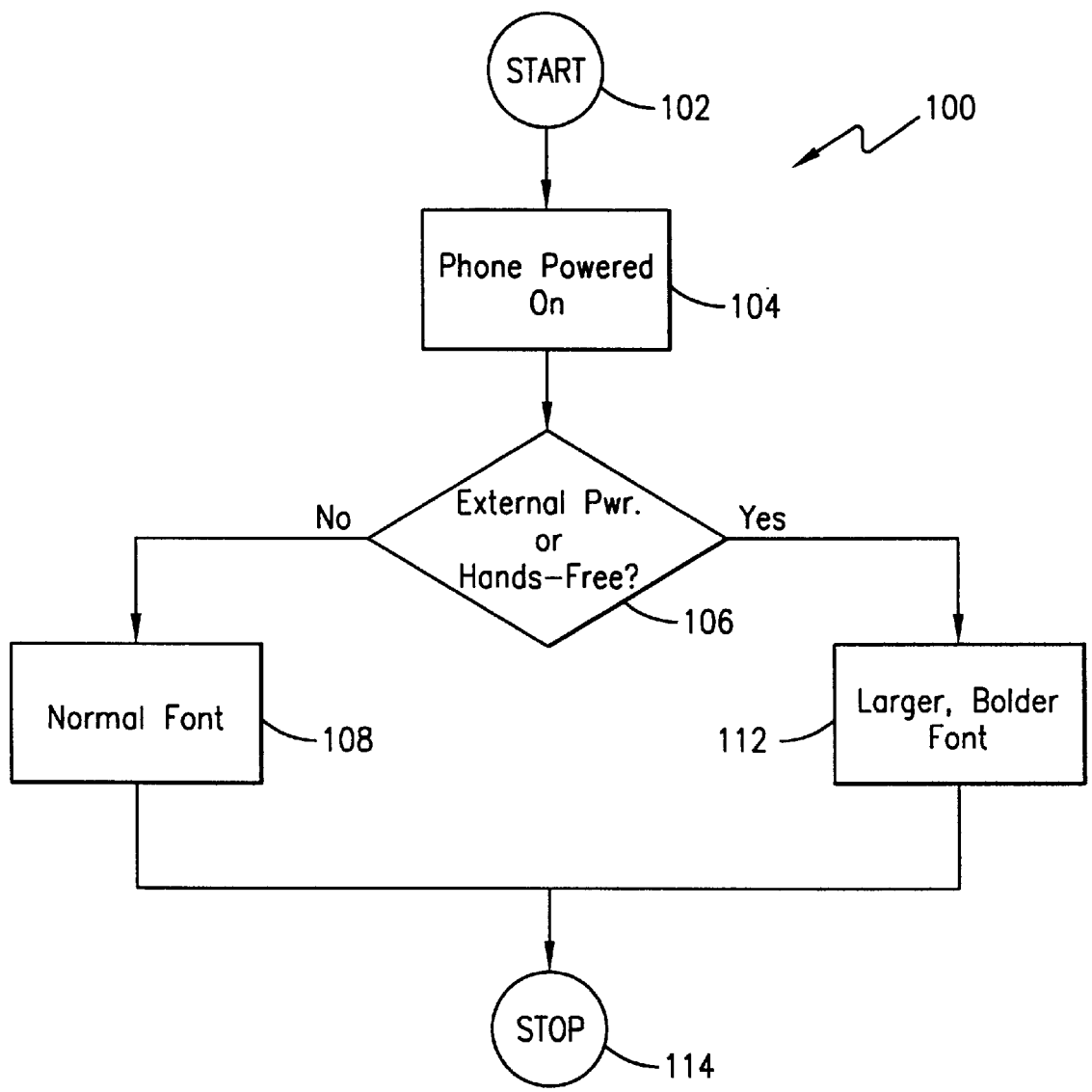
FIG. 2 is a flow diagram that illustrates a method that can be used to improve the readability of a mobile phone display, in accordance with the preferred embodiment of the present invention.

The preferred embodiment of the present invention and its advantages are best understood by referring to FIGS. 1–3 of the drawings, like numerals being used for like and corresponding parts of the various drawings.

FIG. 1 is a diagram of a mobile phone 10 with a display that can automatically compensate for situations in which poor lighting conditions are likely, in accordance with a preferred embodiment of the present invention. As such, mobile phone 10 can be any type of communications terminal used in a mobile environment, such as, for example, a cellular phone used in a motor vehicle (auto, truck, etc.). The exemplary mobile phone 10 includes a display 12 for displaying alphanumeric text (and optionally, battery and signal strength indicators), a keypad 14 for inputting alphanumerics, an internal microphone (not explicitly shown), and a speaker 15. Mobile phone 10 also includes an external power and microphone/speaker connector 16. For this embodiment, the external connector 16 includes a first pair of input pin connections 16a and 16b for applying external power, and a second pair of pin connections 16c and 16d used as input/output connections for an external microphone/speaker set (not shown). Preferably, for this embodiment, a sensor (not explicitly shown) can determine if an appropriate supply voltage has been applied to the external power input pin connections 16a and 16b, or that a microphone/speaker connection has been made to the external microphone/speaker input/output pin connections 16c and 16d. Alternatively, the sensor can determine if the external connector 16 (and thus the mobile phone) has been connected, for example, to a vehicle-mounted hands-free adaptor unit. The exemplary sensor is preferably coupled to an internal processor (not shown) in mobile phone 10 that controls the functionality of the phone.

Although connector 16 is shown in FIG. 1 as a four-pin configuration, this structure is for illustrative purposes only. Essentially, the mobile phone's internal processor can determine if external power has been applied to the mobile phone 10, or if the mobile phone is being operated in a hands-free mode (e.g., connected to a vehicle-mounted hands-free adaptor unit). In any event, the particular connection arrangement, type of connector used, or means for sensing external power or hands-free operation should not be considered as a limitation on the scope of the present invention.

FIG. 2 is a flow diagram that illustrates a method 100 that can be used for improving the readability of a mobile phone display, in accordance with the preferred embodiment of the present invention. For illustrative purposes, the method 100 is described herein with respect to the exemplary mobile phone 10 shown in FIG. 1. However, the invention is not intended to be limited only to the mobile phone shown in FIG. 1. Essentially, the method 100 can be used to improve the readability of any type of mobile phone that is used in a poorly-lit or hands-free environment.

Referring to FIGS. 1 and 2, at step 104 of the method, the mobile phone 10 is turned on (e.g., power is applied). At step 106, the internal processor (not shown) in the mobile phone 10 determines (e.g., via a sensor) whether external power has been applied to the connector 16 at pins 16a and 16b, or an external microphone/speaker has been connected to pins 16c and 16d (e.g., for hands-free operation). If neither of these conditions is present, then at step 108, the internal processor provides instructions for the display circuitry (12) to generate and display text with a conventional font size and style (normal size and regular font style or unbolded). An example of such a normal font being displayed on mobile phone 10 is shown in display 12a in FIG. 3A.

On the other hand, at step 106, if at least one of these conditions is present (e.g., external power has been applied, or the mobile phone is otherwise connected for hands-free operation), then at step 112, the mobile phone's internal processor provides instructions for the display circuitry (12) to display text with a much larger font size and bolder font style than normal. In accordance with the present invention, an example of the larger, bolder font being displayed on mobile phone 10 is shown in display 12b in FIG. 3B. Preferably, the size and boldness of the font shown in FIG. 3B should make the text clearly readable at about three-to-four feet away. As such, the present invention automatically adjusts to improve the readability of the mobile phone's display in order to compensate for situations in which poor lighting conditions are likely.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving readability of a mobile phone display, the method comprising the steps of:

determining whether a mobile phone associated with said mobile phone display is connected to an external power supply;

determining whether the mobile phone associated with the mobile phone display is connected to at least one of an external speaker or an external microphone; and switching said mobile phone display from a first display mode to a second display mode in response to a determination that said mobile phone is either connected to the external power supply or connected to at least one of an external speaker or an external microphone, said second display mode displaying characters having a larger, bolder font than characters in said first display mode.

2. A display for a mobile phone, comprising:

a sensor for detecting whether said mobile phone is connected to one of either an external power supply or at least one of an external speaker or an external microphone;

a display device configured to switch from a first display mode to a second display mode in response to said sensor detecting that said mobile phone is connected to one of either an external power supply or to at least one of an external speaker or an external microphone, said second display mode displaying characters having a larger, bolder font than characters in said first display mode.

3. A display for a mobile phone, comprising:

a sensor for detecting whether said mobile phone is connected to one of either an external power supply and an external speaker;

a display device configured to switch from a first display mode to a second display mode in response to said sensor detecting that said mobile phone is connected to one of either an external power supply and an external speaker, said second display mode displaying characters having a larger, bolder font than characters in said first display mode.

\* \* \* \* \*